United States Patent [19]

Steinbach et al.

[11] Patent Number: 4,614,633

[45] Date of Patent: Sep. 30, 1986

[54] RELEASE AGENT FOR POLYURETHANE MOLDING COMPOSITIONS

[75] Inventors: Hans-Horst Steinbach, Bergisch-Gladbach; Matthias Rieder, Roesrath, both of Fed. Rep. of Germany

[73] Assignee: Bayer Aktiengesellschaft, Leverkusen, Fed. Rep. of Germany

[21] Appl. No.: 689,757

[22] Filed: Jan. 9, 1985

[30] Foreign Application Priority Data

Jan. 18, 1984 [DE] Fed. Rep. of Germany ....... 3401484

[51] Int. Cl.$^4$ ................................. B28B 7/36
[52] U.S. Cl. ..................................... 264/338; 524/588
[58] Field of Search ........................ 524/588; 264/338; 528/25, 29; 106/38.2; 525/475

[56] References Cited

U.S. PATENT DOCUMENTS

| | | | |
|---|---|---|---|
| 3,057,822 | 10/1962 | Rust et al. | 528/25 |
| 3,624,190 | 11/1971 | Cekada et al. | 264/338 |
| 4,244,912 | 1/1981 | Battice | 264/338 |
| 4,248,825 | 2/1981 | Coon et al. | 106/38.2 |
| 4,404,349 | 9/1983 | Keogh | 528/25 |

*Primary Examiner*—Lewis T. Jacobs
*Attorney, Agent, or Firm*—Sprung Horn Kramer & Woods

[57] ABSTRACT

A release agent for a polyurethane molding composition by weight comprising about 90 to 97 parts of an organic solvent and about 10 to 3 parts of a TiO group-containing polysiloxane.

1 Claim, No Drawings

RELEASE AGENT FOR POLYURETHANE MOLDING COMPOSITIONS

This invention relates to a release agent for polyurethane molding compositions based on metal oxide group-containing organopolysiloxane, which is characterized in that it contains from 90 to 97 parts, by weight, of an organic solvent and from 3 to 10 parts, by weight, of a titanium oxide group-containing polysiloxane compound.

Polyurethane molding compositions, in particular polyurethane foams, are widely processed for the production of a variety of moldings and articles. Molds made of plastics (for example epoxide resin) or of metal (for example aluminum) are used for foaming. The polyurethane molding compositions adhere extremely firmly to such molds. It is therefore essential to use suitable release agents. The release agent is usually sprayed into the mold in the form of a suitable solution (for example in organic solvents) after each mold-release operation. It is important that the release agent does not form a residue in the mold and that no remains of polyurethane molding compositions remain in the mold as this would impair the precision of the molding to be produced.

Silicones may be used as release agents. However, they are unsuitable in the form of dimethyl polysiloxanes as they exhibit no release properties relative to polyurethane.

It has surprisingly been found that, from the wide variety of organopolysiloxanes available, those in which TiO groups are incorporated in the siloxane chain are eminently suitable for the desired purpose. Suitable substances may be produced by mixing silicone oils with titanium compounds.

This effect is all the more surprising as it is known that alkyl titanate compounds act as adhesives and are used to improve the adhesion of various coating compositions, resins polyethylene, silicone rubber, adhesives and also polyurethane (c.f. U.S Pat. Nos. 3,080,266, 2,838,418, 2,751,314, IT-PS No. 7,018,231, FR-PS No. 1,542,494, DE-PS No. 1,117,248, U.S. Pat. No. 2,736,721).

The object of the present invention which is to provide a release agent for polyurethane molding compositions is achieved by a composition based on organopolysiloxane which is characterized in that it comprises from 90 to 97 parts, by weight, of an organic solvent and from 3 to 10 parts, by weight, of a TiO group-containing polysiloxane.

The effect of the release agent for polyurethane molding compositions is based on a synergistic effect of the individual substances in the mixture. Polysiloxanes alone and the specified metal compounds alone do not have a releasing effect relative to polyurethane. Alkyl titanates, on the other hand, act as adhesives. However, if mixtures of these two types of compounds are used, as in the present invention, excellent release properties are obtained relative to polyurethane.

It is immaterial whether the component used to produce the polyurethane is a polyether or polyester.

A further object of the present invention which is to provide a process for providing molds with releasing agents for polyurethane molding compositions is achieved by applying the release agent according to the present invention.

Suitable starting substances for the agent according to the present invention include OH group-containing polydimethyl siloxanes having a viscosity of from 10 to 100,000 mPas, measured at 25° C. The metal oxide groups may be incorporated into the polysiloxane compound, for example, by a Grignard reaction. However, it may also be produced simply by stirring a titanium ester with a polydiorganosiloxane. Instead of OH-group-containing polysiloxanes, it is also possible to use trimethylsilylterminated polysiloxanes of comparable viscosity.

Ortho-titanic acid tetrabutyl ester is a preferred metal compound. The content of metal oxide groups in the polysiloxane should be calculated such that there are approximately from 1 to 100 SiO groups per metal oxide. From 30 to 40 %, by weight, of specified metallic ester, based on the polysiloxane content, are preferred.

The metal oxide group-containing polysiloxanes suitable for the process according to the present invention are used in organic solvents.

Suitable solvents include petroleum fractions, hydrocarbon, fluorides, chlorinated hydrocarbons or mixtures thereof. The choice of solvent depends on the application and the temperature of the mold at which the solvent evaporates. The polysiloxane metal oxide compound according to the present invention should be present in the solvent in a concentration of from about 3 to 10 %, by weight. This solution may optionally be combined with other, for example, wax-containing solutions or dispersions.

The agent according to the present invention contains from about 90 to 97 parts, by weight, preferably from 92 to 96 parts, by weight, of organic solvent selected from petroleum fractions, hydrocarbon fluorides and chlorinated hydrocarbons or mixtures thereof, and from 3 to 10 parts, by weight, preferably from 4 to 8 parts, by weight, of the polysiloxane titanium ester compound.

The use according to the present invention may be adopted with any polyurethane molding composition. The method of production and the starting components in the polyurethane molding compositions are immaterial. The agent according to the present invention or the use thereof may be adopted for all common types of polyurethane as described for example, in Kunststoff Handbuch, 7. Polyurethane, 2nd edition, Hauser-Verlag 1983.

The objects of the present invention will now be described in more detail with reference to the following examples wherein "parts" relate to parts, by weight.

EXAMPLES 1. 11.2 Parts of ortho-titanic acid tetrabutyl ester are added with stirring to 28.8 parts of $\alpha,\omega$-hydroxypolydimethyl siloxane having a viscosity of 1000 mP.s. The viscosity rises and finally falls again to from 400 to 2000 mP.s. After stirring for 1 hour, 40 parts of white spirit having a boilding range of from about 140 to 180° C. are added and, after stirring for a further 10 minutes, 920 parts of 1,1,1-trichlorethane are added. A thinly liquid solution is obtained.

Examination of the release effect:

For this purpose, polyurethane foams having an integral outer skin are produced from conventional commercial polyether polyol and isocyanate. The molding foams has a bulk density of up to 300 kg/m$^3$, but at least 45 kg/m$^3$. Foaming is carried out in a mold which may be heated and has a volume of 850 cm$^3$. The mold is composed of galvanized sheet steel.

The steel mold is sprayed thinly with the release agent described in Example 1 using a spraying apparatus. The temperature of the mold is about 50° C. The reactants required for producing the polyurethane foam are then introduced. On completion of foaming, the mold is opened after a curing time of 5 minutes. The mold may easily be opened, the foamed article separates very easily from the mold and may be removed without difficulty.

After treating the mold once with the agent produced according to Example 1, it is possible to carry out up to 5 foaming operations without the film of release agent having to be renewed. The release agent forms no residue in the mold. No polyurethane residues which would affect the dimensional accuracy of the moldings to be produced remain in the mold owing to the good releasing effect of the present agent.

COMPARISON EXAMPLES (2a) If the titanic acid butyl ester in Example 1 is replaced by a zirconium ester, such as tetrabutyl zirconate, and if the method described in Example 1 is adopted, products are obtained which do not have the desired properties.

(b) If the titanic acid butyl ester in Example 1 is replaced by tin compounds, such as dibutyl tin dilaurate, and the method described in Example 1 is adopted, products are obtained which do not have the desired properties.

(c) If the titanic acid butyl ester in Example 1 is replaced by other polyorganosiloxane, resins thereof or by solvents, the desired effect is not obtained.

(d) If the $\alpha,\omega$-hydroxy polydimethylsiloxane in Example 1 is replaced by trimethyl-siloxy-terminal silicone oils, release agents having the desired properties are obtained.

(e) If the addition of ortho-titanic acid tetrabutyl ester in Example 1 is reduced to 7 parts or if the addition is increased to 14 parts, products are obtained which do not have the desired releasing properties, but which instead cause marked adhesion relative to polyurethane.

It will be understood that the specification and examples are illustrative but not limitative of the present invention and that other embodiments within the spirit and scope of the invention will suggest themselves to those skilled in the art.

We claim:

1. In the production of a molded polyurethane article wherein a mold is coated with a release agent, polyurethane is supplied to the mold, the article is removed from the mold, and additional articles are cast in the mold, the improvement which comprises employing as the release agent a composition comprising about 90 to 97 parts by weight of an organic solvent and about 10 to 3 parts by weight of a TiO group-containing polysiloxane wherein in said TiO group-containing polysiloxane TiO groups are incorporated into the polysiloxane wherein there are about 1 to 100 SiO groups per TiO group in said TiO group-containing polysiloxane.

* * * * *